(12) United States Patent
Sato

(10) Patent No.: US 6,402,619 B1
(45) Date of Patent: Jun. 11, 2002

(54) METHOD FOR DISPLAYING A SHOOT OF A CHARACTER IN A VIDEO GAME, STORAGE MEDIUM FOR STORING A VIDEO GAME PROGRAM, AND VIDEO GAME DEVICE

(75) Inventor: Masahiro Sato, Tokyo (JP)

(73) Assignee: Konami Co., Ltd., Tokyo (JP)

( * ) Notice: Subject to any disclaimer, the term of this patent is extended or adjusted under 35 U.S.C. 154(b) by 0 days.

(21) Appl. No.: 09/507,678

(22) Filed: Feb. 22, 2000

(30) Foreign Application Priority Data

Feb. 19, 1999 (JP) .......................................... 11-042406

(51) Int. Cl.[7] .................................................. A63F 7/06
(52) U.S. Cl. ................................ 463/43; 463/4; 463/23
(58) Field of Search ................ 463/1–5, 23; 273/317.1, 273/317.3, 108.1

(56) References Cited

U.S. PATENT DOCUMENTS

| 4,657,247 A | * | 4/1987 | Okada | 463/23 |
| 4,752,069 A | * | 6/1988 | Okada | 273/23 |

* cited by examiner

*Primary Examiner*—Joe H. Cheng
*Assistant Examiner*—Yveste G Cherubin
(74) *Attorney, Agent, or Firm*—Sughrue Mion, PLLC

(57) ABSTRACT

When judging the results of the action of a game character in accordance with the skill of the input technique of a player, operations that are to be input by the player are specified as a task operation, which is displayed on a screen for a prescribed period of time and then erased, whereupon an input operation from the player is received and the results of the action of the game character are judged on the basis of the task operation and the input operation.

17 Claims, 12 Drawing Sheets

METHOD FOR DISPLAYING A SHOOT OF A CHARACTER IN A VIDEO GAME, STORAGE MEDIUM FOR STORING A VIDEO GAME PROGRAM, AND VIDEO GAME DEVICE

BACKGROUND OF THE INVENTION

1. Field of the Invention

The present invention relates to a screen display method and screen display device for executing an exhibition match, in a sports game, and a storage medium for storing a game program for displaying screens required in an exhibition match. Moreover, the present invention relates to a game device for executing an exhibition match.

2. Description of the Related Art

In general, games played on this kind of game device include various types of games, such as simulation games, role-playing games, fighting games, puzzle games, and the like. In addition, games relating to sports which will be called sports games are also divided into a wide variety of games, such as golf games, baseball games, soccer games, basketball games, horse racing games, and the like. All of such sports games are widely sold in a market and have considerably become popular among game users.

In manufacturing these sports games, it often happens that a technique is adopted such that rules of real sports are simulated to enhance realism of a sports game of that type. This technique of manufacturing the sports games is helpful to have a lot of people take an interest in the sports games even if such people are not interested in the sports games themselves.

More specifically, abilities and other features of teams or characters involved in a game are reflected by referring to real teams, players, individual merits and performance records, and the like. The resultant sports games are played under rules which are close to the rules of the real game. Consequently, these sports games closely imitate real sport, and hence they have an advantage in that they also appeal to people who actually play sports, but show little interest in games played on a device.

On the other hand, there are also many sports competitions wherein an exhibition match is played when the main sports match has finished, or when there is a rest period during the game. In an exhibition match of this kind, the players taking part are able to play freely without adhering to normal rules, and therefore it is possible for the general spectators to enjoy special plays made by the players, which they cannot normally witness. Consequently, these exhibition matches, and the like, which are not played in a consistent manner, are extremely popular amongst general spectators.

However, a further aspect of these exhibition matches is that since they are often played by disregarding standard rules, and hence lack consistency, they are difficult to incorporate into conventional methods for simulating real sports games.

For example, basketball is one sport which is very popular in the United States of America, and in particular, basketball games played in the NBA (U.S. Professional Basketball League) have many fans across the whole world. In some of these NBA basketball games, exhibitions called dunk contests were carried out in the past. Furthermore, entertaining exhibitions called three-point shoot-outs have often been played during NBA all-star matches.

Herein, a dunk contest has been performed as an exhibition match. In the dunk contest, players have competed with one another in the artistry, excitement and a level of difficulty of dunk shots performed by pushing the ball down through the basket. On the other hand, in three-point shoot-outs which are being now performed as exhibition matches, players compete with one another in the number of balls they successfully shoot into the basket from outside the three-point line marked on the basketball court.

SUMMARY OF THE INVENTION

In these entertaining exhibition matches, when artistry, excitement, level of difficulty, and the like, are assessed and marked visually in a dunk contest, for instance, then the visual assessment standards will vary between different individuals assessing the contest, and hence it is difficult to devise a dunk contest game which can be played on a game device, and in fact, no examples of such games for a game device currently exist.

Moreover, since the very nature of this type of exhibition match is a contest that takes place in a peripheral manner with respect to the actual basketball match, or the like, then if a game for such an exhibition match is to be devised, desirably, it should be appended as a mini-game which is supplementary to the game relating to the actual sports match.

It is an object of the present invention to provide a screen display method and device whereby an exhibition match played as entertainment in conjunction with an actual sports match can be formed into a thrilling and interesting exhibition game involving only simple operations by the user.

It is a further object of the present invention to provide a screen display method and device whereby an exhibition match in basketball can be formed into a game which increases the user's interest.

It is a further object of the present invention to provide a screen display method and device whereby a dunk contest exhibition match in basketball can be formed into a game.

It is yet a further object of the present invention to provide a computer-readable and writable storage medium storing a dunk contest game which is thrilling and interesting, and does not require a high level of skilled experience.

It is a further object of the present invention to provide a storage medium storing the aforementioned dunk contest game in the form of a mini-game in a main basketball game.

It is a further object of the present invention to provide a video game device whereby the aforementioned dunk contest game can be executed.

In order to achieve the aforementioned objects, the following types of invention are provided as a screen display method, storage medium for storing a game program and game device, for implementing a game based on a ball game, which includes a shooting action in the rules thereof, and displaying said action on a display device. Basketball and soccer are examples of the aforementioned ball game which includes a shooting action in the rules thereof, but the game in question does not necessarily have to involve a ball, and also includes, for example, sports using a puck, such as ice hockey, or the like.

In the screen display method, storage medium storing a game program and video game device according to the present invention, operations that are to be input by the player are specified as a task operation, which is displayed on a screen for a prescribed period of time and then erased. The player makes note of the task operation while it is being displayed on the screen, and then enters an input operation using an input device, once the game device has entered an input receiving state. A shooting action scene is determined on the basis of the task operation and the input operation, and a situation is displayed wherein a player represented by a character in the game performs a shooting action. Here, the shooting action scene is determined not only on the basis of a two-value judgement which simply indicates whether the shooting action is successful of unsuccessful, but it may also incorporate results which are divided into multiple stages, such as the artistry of the shooting action in a dunk contest, for example.

In this way, in the present invention, the player has to note and enter the task operation displayed, and hence the player is not required to remember a complex series of operations.

In one example, the aforementioned task operation may involve pressing buttons on an input device provided with n types of button, according to a sequence of one combination involving r buttons (where n and r are natural numbers and any button may be used more than once). One combination may be generated at each determining step. Moreover, r may also be specified according to a predetermined level of difficulty.

When displaying a shooting scene, it is possible to enhance the sense of realism for the player if different animation sequences are displayed depending on the judgement results. In this case, it is also possible to display different animation sequences depending not only on the judgement results, but also on the level of difficulty. Moreover, it is also possible to display different animation sequences depending on the period of time required from the start to completion of the input operation receiving process and the degree to which the input operation matches the task operation.

DESCRIPTION OF THE PREFERRED EMBODIMENTS

Below, description will be made about a screen display device according to one embodiment of the present invention.

Firstly, one example of a game device to which the present invention can be applied will be described. Moreover, the example of a game device illustrated here is a consumer video game device, but it is also possible to use a personal computer device, graphics computer device, or commercial game machine.

The program constituting the game relating to the present invention is stored on an optical disk 100 (a disk-shaped storage medium such as a CD-ROM, for example), and this program is read out according to instructions from the user, in a state where the aforementioned disk is loaded into the game device, thereby enabling a game to be played in accordance with the program.

Figure 1:
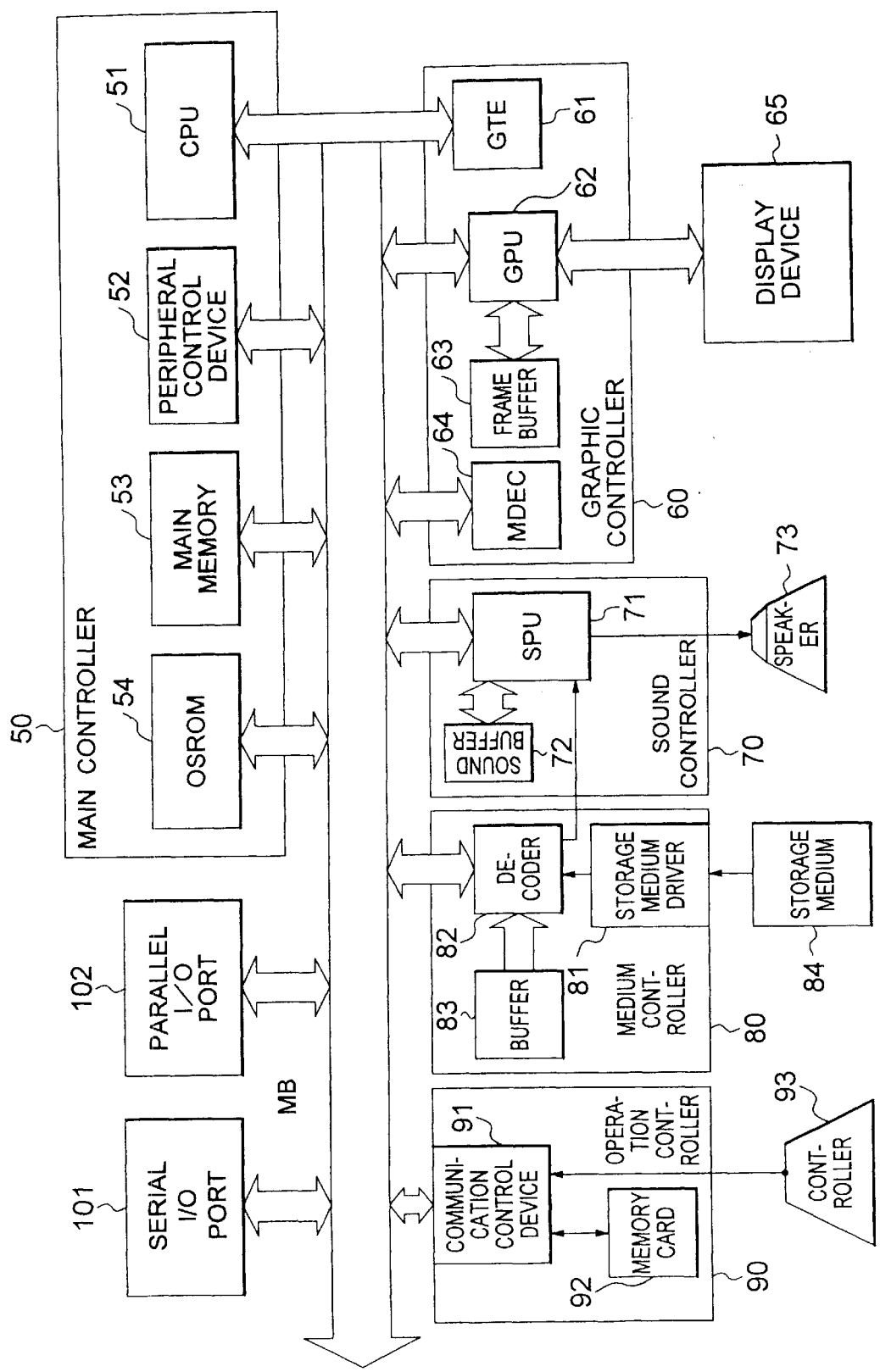
FIG. 1 is a block diagram showing one example of a video game device to which the present invention can be applied.

More specifically, as illustrated in FIG. 1, the game device relating to the present invention comprises a main controller 50, a graphic controller 60, sound controller 70, medium controller 80, and operation controller 90, and these controllers 50, 60, 70, 80, and 90 may be known collectively as a control unit. The controllers 50, 60, 70, 80, and 90 illustrated, in other words, the control unit, are all connected to the main bus MB, and in the example illustrated, a parallel I/O port 102 for connecting with other peripheral devices and a serial I/O port 101 for conducting communications with other game devices, and the like, are connected respectively to the main bus MB. Moreover, the main controller 50, operation controller 90 and medium controller 80 functions as a game control section for controlling the execution of a game in accordance with actions implemented by a player by means of a controller 93, which functions as an operational input section.

The main controller 50 illustrated in the drawings comprises a central processing unit (CPU) 51, peripheral control device 52, main memory 53, and operating system (OS) ROM 54. More specifically, the peripheral control device 52 provided in the main controller 50 described above implements operations such as interrupt control, time control, memory control, direct memory access (DMA) transfer, and the like. The main memory 53, on the other hand, is constituted by a 2-Mb RAM, for example, whilst the OSROM 54 has, for example, a 512-Kb composition for storing a program such as a so-called operating system, which controls the main memory 53, graphic controller 60, sound controller 70, and the like.

The CPU 51 illustrated is, for example, a 32-bit RISC (reduced instruction set computer) CPU, which controls the whole device by executing the operating system stored in the ROM 54. The CPU 51 is provided with a command cache and a scratch-pad memory, and it also manages the actual memory.

Moreover, the graphic controller 60 comprises a geometry transfer engine (GTE) 61, a graphics processing unit (GPU) 62, a frame buffer 63, and an expansion circuit 64. The GPU 62 contained in this graphic controller 60 is connected to a display device 65. In this case, the graphic controller 60 functions as a display control section for controlling the display of game screens on the display device 65.

In the case of a standard domestic game device, the display device 65 will be a television monitor, in the case of a personal computer or work station, it will be a computer display, and in the case of a commercial game device, it will be a game display device.

The geometry transfer engine (GTE) 61 in the aforementioned graphic controller 60 is constituted by a co-ordinates calculating co-processor which carries out processing such as co-ordinates conversion, and the like, whilst the graphics processing unit (GPU) 62 performs drawing operations in accordance with drawing instructions (drawing commands) from the CPU 51. The screens drawn by this GPU 62 are, for example, stored in a 1 Mb frame buffer 63. Moreover, the expansion circuit 64 performs orthogonal conversion, such as so-called discrete cosine transform, or the like, and is constituted by a screen decoder (hereinafter, called MDEC) for decoding screen data which has been compressed and encoded.

The aforementioned geometry transfer engine (GTE) 61 comprises, for example, a parallel computing mechanism for executing a plurality of calculations in parallel, and it functions as a co-processor to the CPU 51, being capable of carrying out operations such as co-ordinate conversion for perspective conversion, or the like, light source calculation by inner product calculation of a normal vector and a light source vector, and fixed-point matrix and vector calculations, for example, at high speed, in accordance with calculation requests from the aforementioned CPU 51.

More specifically, if the GTE 61 is performing calculations for flat shading whereby the same color is drawn onto a single triangular-shaped polygon, then it is capable of carrying out co-ordinate calculations for a maximum of approximately 1,500,000 polygons in one second. Therefore, in this screen processing system, it is possible to reduce the load on the CPU 51, whilst also carrying out high-speed co-ordinate calculations. A polygon is the smallest unit of drawing for constituting a three-dimensional object displayed on a display screen, and it is constituted by a polygonal shape, such as a triangular or quadrilateral shape. In the present invention, the co-ordinates of each polygon are calculated by the GTE 61, as described below.

The graphics processing unit (GPU) 62 operates in accordance with polygon drawing commands from the CPU 51 and draws polygons, and the like, to the frame buffer 63. This GPU 62 is capable of drawing a maximum of approximately 360,000 polygons per second. The GPU 62 also comprises a two-dimensional address space, independently of the CPU 51, to which the frame buffer 63 is mapped.

The frame buffer 63 is a so-called dual port RAM, which simultaneously transfers images from the GPU 62 and from the main memory 53, and performs read-out operations in order to display these images. More specifically, the frame buffer 63 has a capacity of 1 Mb, for example, which is treated as a matrix of 1024 horizontal by 512 vertical pixels, each respectively comprising 16 bits.

The frame buffer 63 is capable of outputting a desired display region within the stored screen display region to a display device 65, for example. Moreover, in addition to the display region output as a video output, the frame buffer 63 also comprises a CLUT region for storing a color look-up table (CLUT) which is referred to when the GPU 62 is drawing polygons, and the like, and a texture region for storing elements (texture) which are mapped onto polygons, and the like, drawn by the GPU 62 by co-ordinate conversion during the drawing process.

The frame buffer 63 to which images have been drawn can be transferred by high-speed DMA transfer to the main memory 53.

On the other hand, the expansion circuit (MDEC) 64 of the graphic controller 60 decodes stationary image or animated image data read out from the storage medium 84 and stored in the main memory 53, and it restores this decoded data in the main memory 53. More specifically, the MDEC 64 is capable of carrying out high-speed inverse discrete cosine transform (inverse DCT) operations, and is also capable of expanding compressed data by means of a color stationary image compression standard (known as JPEG) or a storage media animated image encoding standard (known as MPEG), read out from the storage medium 84.

Moreover, the screen data generated in this manner is stored via the GPU 62 in the frame buffer 63, thereby enabling this data to be used as a background for screens drawn by means of the aforementioned GPU 62.

Furthermore, the sound controller 70 comprises a sound regeneration processing unit (SPU) 71 for generating music, sound effects, and the like, on the basis of commands from the CPU 51, a sound buffer 72 of 512 Kb capacity, for example, for storing sound and music data, sound source data, and the like, read out from the CD-ROM, and a speaker 73 forming sound output means for outputting music, sound effects, and the like, generated by the SPU 71.

The aforementioned SPU 71 comprises an ADPCM decoding function for reproducing sound data encoded by adaptive differential encoding (ADPCM) of 16-bit sound data as a 4-bit differential signal, a reproducing function for generating sound effects, and the like, by reproducing sound source data stored in the sound buffer 72, and a modulating function for modulating and reproducing sound data stored in the sound buffer 72. More specifically, the SPU 71 comprises a 24-voice ADPCM sound source having functions such as looping and automatically changing operational parameters based on a time coefficient, and this sound source is operated in accordance with commands from the CPU 51. Moreover, the SPU 71 also manages an independent address space to which the sound buffer 72 is mapped, and it transfers ADPCM data from the CPU 51 to the sound buffer 72 and reproduces data by directly transferring key on/key off and modulation information.

By providing these functions, the sound controller 70 can be used as a so-called sampling sound source which generates music, sounds effects, and the like, on the basis of sound data, etc. stored in the sound buffer 72, in accordance with instructions from the CPU 51.

The medium controller 80, on the other hand, is constituted by a storage medium driver 81, decoder 82, and buffer 83, and a storage medium 84 is inserted into storage medium driver 81. Here, as a storage medium, it is possible to use, for example, a CD-ROM, hard disk, optical disk, flexible disk, semiconductor memory, or the like, but in this example, a device using a CD-ROM as a storage medium is described. In this respect, the storage medium driver 81 is a CD-ROM driver and the decoder 82 is a CD-ROM decoder. The program for the screen display method relating to the present invention is stored on the aforementioned storage medium 84.

The aforementioned storage medium driver 81 comprises a function for reproducing programs, data, and the like, stored on the storage medium 84, which is constituted by a CD-ROM disk, and the decoder 82 comprises a function for decoding the programs, data, and the like, which have been stored by appending a error correction code (ECC), for example. Moreover, the buffer 83 is constituted by a RAM having a 32 Kb storage capacity, for example, for temporarily storing data reproduced from the storage medium driver 81.

Here, disk formats such as CD-DA, CD-ROM XA, or the like, may be supported, and since the decoder 82 also reproduces sound data stored on the storage medium, it also functions as a portion of the sound controller 70.

The sound data stored on the disk operated by the storage medium driver 81 may be ADPCM data (ADPCM data for CD-ROM XA format, or the like), or it may be so-called PCM data, wherein the sound signal is analogue/digital converted.

Of the sound data described above, ADPCM data is stored, for example, by representing the differentials between 16-bit digital data in a 4-bit format, and after this ADPCM data has been error corrected and decoded by the decoder 82, it is supplied to the SPU 71 which conducts processing for digital/analogue conversion, or the like, and then outputs a signal to the speaker 73.

On the other hand, sound data formed by means of PCM data stored as 16-bit digital data, for example, is decoded by the decoder 82 and then used to drive the speaker 73. The audio output from the decoder 82 is first input to the SPU 71 and mixed with the SPU output, whereupon it is passed through a reverb unit to produce a final audio output.

The operation controller 90 provided in the game device illustrated in FIG. 1 comprises a communication control device 91 for controlling communications with the CPU 51 by means of the main bus MB, and an auxiliary memory (memory card) 92. A controller 93 by which instructions from the user, in other words, from the player, are input is connected to the communication control device 91. Here, the memory card 92 forming the auxiliary memory is used to store instructions, game settings, and the like, input via the controller 93.

The controller 93 is an interface for transferring the user's intentions to the application, and in order to input instructions from the user, the controller 93 comprises, for example, 16 individual instruction keys, and it communicates the status of these instruction keys to the communication control device 91 approximately 60 times a second, by means of synchronous communications.

The communication control device 91 transfers the status of the instruction keys of the controller 92 to the CPU 51. The controller 93 has two connectors provided on the main unit thereof, and besides these, it is also possible to connect a plurality of controllers by using a multi-tap device.

In this way, instructions from the user are input to the CPU 51 and the CPU 51 conducts processing in accordance with the instructions from the user, on the basis of the game program, or the like, being executed.

Moreover, when settings for the game being played, or points scores at the end of a game or during a game, or the like, need to be stored, the CPU 51 transfers this data to be stored to the communication control device 91, and the communication control device 91 stores the data received from the CPU 51 on the memory card 92. Since the memory card 92 is separated from the main bus MB, it can be attached and detached whilst the power supply is connected. Thereby, game settings, and the like, can be stored on a plurality of memory cards 92.

When operations such as reading out programs, displaying or drawing screens, or the like, are being conducted between the main memory 53, GPU 62, MDEC 64, decoder 82, and the like, it is necessary for a large volume of image data to be transferred at high speed.

Therefore, in this image processing system, it is possible to conduct DMA transfer for transferring data directly between the aforementioned main memory 53, GPU 62, expansion circuit (MDEC) 64, decoder 82, and the like, under control implemented by the peripheral control device 52, without involving the CPU 51. Consequently, it is possible to reduce the load on the CPU 51 due to data transfer, thereby enabling data to be transferred at high speed.

Figure 2:
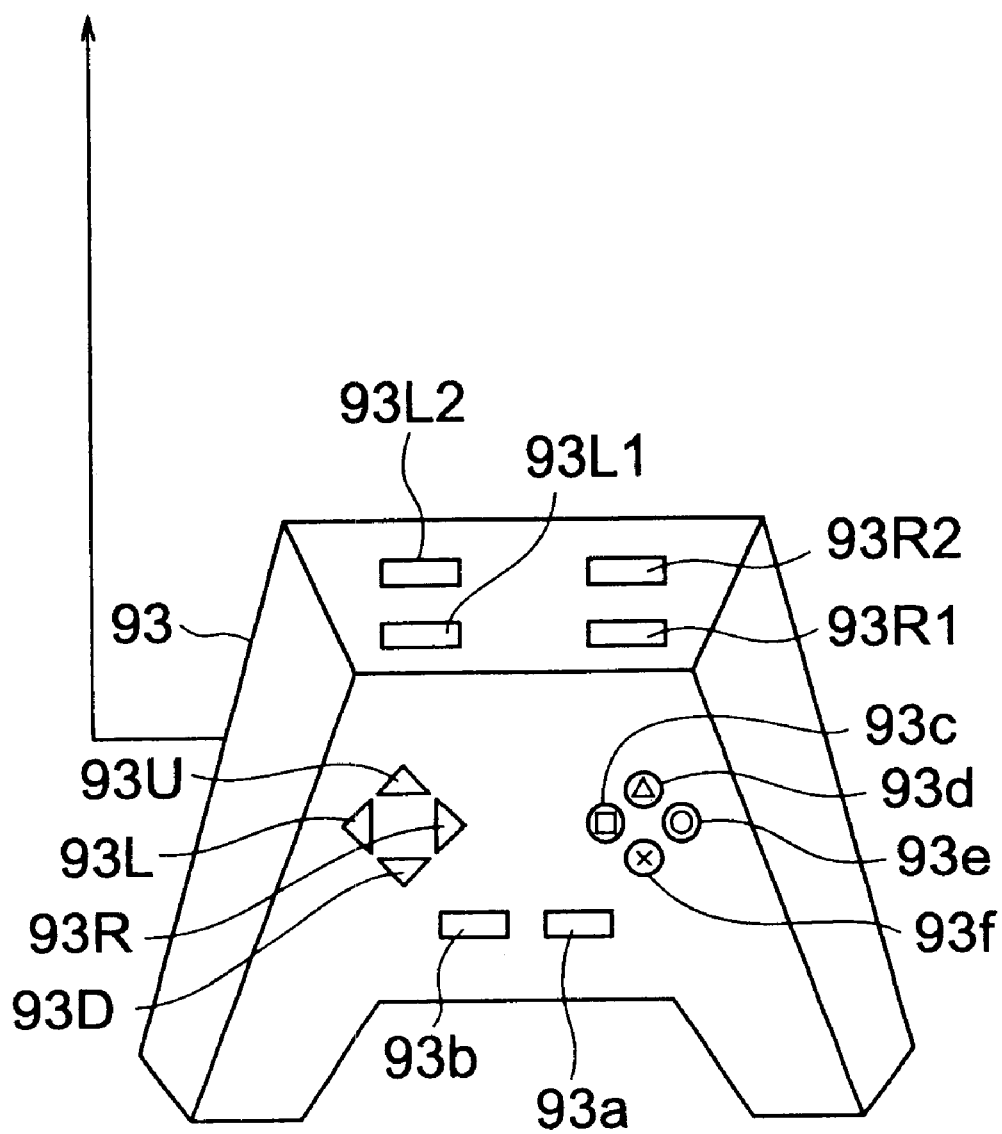
FIG. 2 is an approximate diagram for illustrating an input device for the video game device illustrated in FIG. 1.

Next, the controller 93 used in the game device illustrated in FIG. 1 will be described more specifically with reference to FIG. 2.

The controller 93 comprises a main unit having an approximate board shape, the upper side face of which is provided with a first left button 93L1, a second left button 93L2, a first right button 93R1, and a second right button 93R2. Furthermore, on the left-hand side of the upper face of the main unit of the controller 93, there are also provided an up direction key 93U, a down direction key 93D, a left direction key 93L and a right direction key 93R, and in the central portion of the upper face of the main unit, there are provided a square-shaped start button 93a and select button 93b. Moreover, on the right-hand side of the upper face of the main unit of the controller 93, there are provided a first button 93c, second button 93d, third button 93e, and fourth button 93f, and a square symbol (□), a triangle symbol (△), a circle symbol (○) and a cross symbol (x) are marked respectively on top of the first to fourth buttons 93c–93f. The aforementioned buttons and keys are operated by the player and output operational signals according to the game being played.

Of the aforementioned buttons and keys, the up direction key 93U, down direction key 93D, left direction key 93L and right direction key 93R output commands whereby the player moves the character on the display screen of the display device 65 in an upward, downward, leftward or rightward direction, or commands whereby a selection icon is moved on a menu screen, for example, to the CPU 51 illustrated in FIG. 1.

Moreover, when the start button 93a is operated by the player, an instruction to start the game program loaded from the aforementioned storage medium 84 is supplied to the CPU 51, whilst if the player operates the select button 93b, then various selections relating to game program data loaded from the storage medium 84 to the main memory 53 are communicated to the CPU 51.

Furthermore, the game program downloaded from the storage medium 94 respectively allocates different functions to the first to fourth buttons 93c–93f marked with the □, △, ○ and x symbols, the first left button 93L1, second left button 93L2, first right button 93R1 and second right button 93R2.

In the game device illustrated in FIG. 1, when the power supply is switched on in a state where a storage medium 84 is inserted into the storage medium driver 81, the CPU 51 firstly executes the operating system (OS) stored on the ROM 54. By executing the operating system, the CPU 51 controls the aforementioned graphic controller 60, sound controller 70, and the like. More specifically, when the operating system is executed, the CPU 51 initializes the whole device, including operational checking, and the like, and then controls the medium controller 80.

The operating system, on the other hand, instructs the storage medium driver 81 to read out program data from the storage medium 84. Accordingly, the storage medium driver 81 reads out images, sound and program data from the storage medium 84. The data relating to images, sound and programs read out in this fashion is then supplied to a decoder 82, where the read out data is error corrected.

Of the data which has undergone error correction processing in the decoder 82, the image data is supplied via the main bus MB to the expansion circuit (MDEC) 64. In this example, compressed images compressed by 'intra' encoding based on MPEG (Moving Picture Engineering Group) standards for animated images and JPEG (Joint Picture Engineering Group) standards for stationary images are supplied to the expansion circuit 54 in a variable length code (VLC) format. Consequently, the expansion circuit 64 carries out expansion processing of the compressed images and supplies the expanded image data to the GPU 62, which then writes the data to a non-display area of the frame buffer 63.

Here, the expansion processing in the expansion circuit 64 involves decode processing (decoding data that has been encoded in VLC format), inverse quantization processing, IDCT (Inverse Discrete Cosine Transform) processing, 'intra' image decoding, and the like. The frame buffer 63 comprises a display area and a non-display area, the display area being a region where data to be displayed on the display screen of the display device 65 is gathered and the non-display area being a region where data which is not to be displayed on the display device 65 is gathered. In the present example, data for defining skeletons, model data defining polygons, animation data for causing a model to make movements, pattern data, texture data, and color palette data for showing the details of each animation, and the like, are stored in the non-display area.

Here, the texture data is two-dimensional image data and the color palette data is data for indicating the color of the texture data, and the like.

Returning to FIG. 1, in the decoder 82, sound data which has been ADPCM encoded, or the like, undergoes error correction processing, whereupon it is supplied to the main memory 53 or sound processing unit (SPU) 71 and written to the main memory 53 or sound buffer 72.

Moreover, program data which has undergone error correction processing in the decoder 82 is then transferred to the main memory 53 and written into the main memory 53.

Thereupon, the CPU 51 implements a game on the basis of the game program data stored in the main memory 53 and the commands supplied by the player by operating the controller 93. In other words, the CPU 51 performs the operations of controlling image processing, controlling sound processing and controlling internal processing.

In controlling image processing, the CPU 51 carries out operations such as calculating the co-ordinates of each skeleton, calculating the vertex co-ordinates of the polygons, calculating the acquired co-ordinates data, supplying the acquired three-dimensional co-ordinates data and viewpoint data to the GPU 62, issuing drawing commands containing brightness data and address data for the display area of the frame buffer 63 as derived by the GPU 62, and the like. On the other hand, in controlling sound processing, the CPU 51 performs operations such as issuing sound output commands to the sound processing unit (SPU) 71, designating levels, and the like. Moreover, in controlling internal processing, the CPU 51 performs calculations in accordance with the operations of the controller 93, for example.

Consequently, the display of images and the generation of sound effects and music are controlled by means of the aforementioned graphic controller 60, sound controller 70, and the like, under the control of the CPU 51, in response to inputs made by the player.

Below, a basketball game using the screen display method relating to the present invention is described with reference to the drawings.

Figure 3:
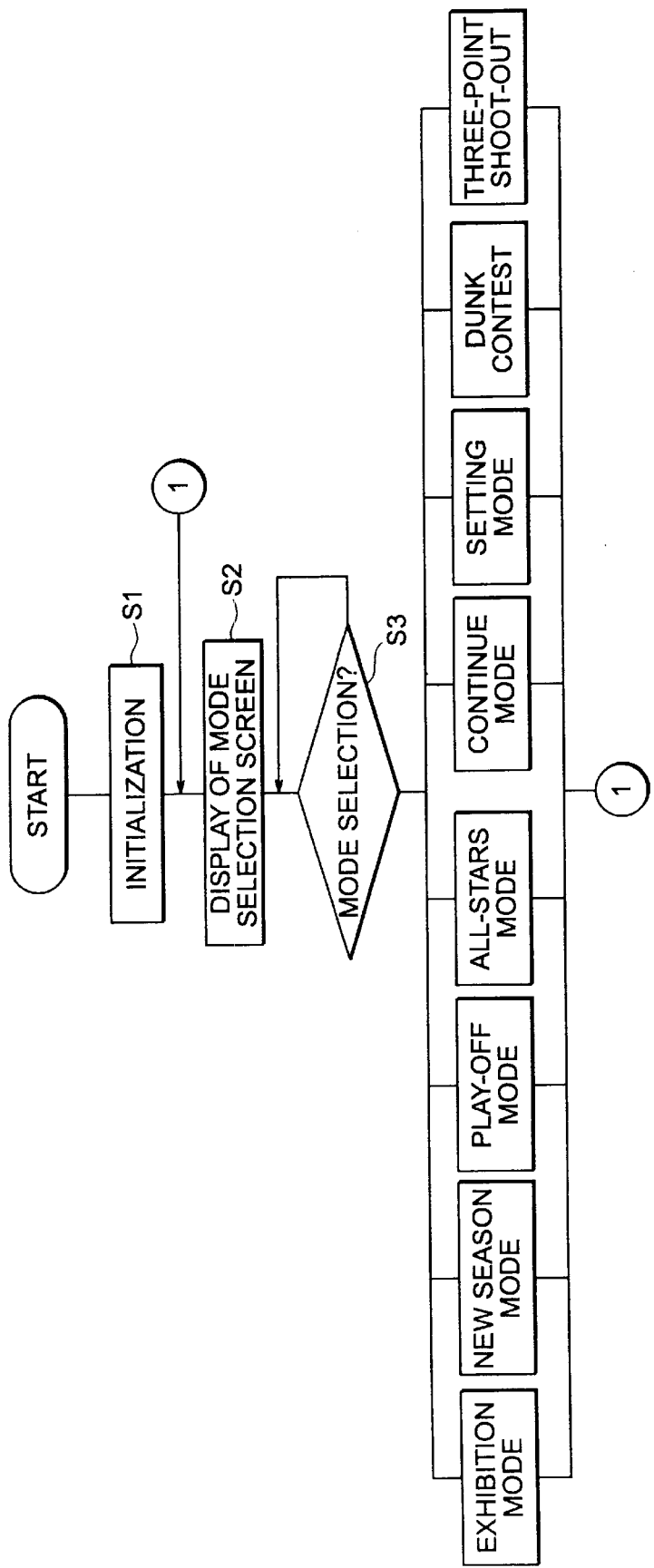
FIG. 3 is a flowchart for giving an approximate illustration of a basketball game relating to the present invention.
Figure 4:
FIG. 4 is an example of a mode selecting screen for a basketball game relating to the present invention.

In FIG. 3, a flowchart of a basketball game relating to the present invention is depicted. A storage medium (for example, a CD-ROM) 84, on which a program for the basketball game in question is stored, is set in the storage medium driver 81 shown in FIG. 1. When the power supply is switched on, the game starts. Firstly, the game device shown in FIG. 1 is put into an initial state (step S1) in which a portion of the program is transferred into the main memory 53 of the game device, and a mode selection screen as illustrated in FIG. 4 is shown on the display device 65 as an initial screen (step S2). As shown in FIG. 4, there are 8 modes prepared on the mode selection screen, namely, exhibition mode, new season mode, NBA playoffs mode, NBA all-star mode, continue mode, setting mode, three-point shoot-out mode and dunk contest mode. The mode selection screen shown in FIG. 4 remains on display until one of the modes is selected.

The present invention relates to the dunk contest mode, of the eight modes described above, and therefore it is assumed that the dunk contest is selected by the cursor represented by an arrow, as illustrated in FIG. 4. Here, a brief description of a dunk contest will be given. A dunk contest was performed as an exhibition which was played in an NBA (U.S. Professional Basketball League) All-stars game, or the like. In the dunk contest, players compete with one another in the artistry of a spectacular shooting action known as a 'dunk'. There are many different forms of dunk shots, and in a real dunk contest, players each use impressive dunk shooting actions in order to display their own skill. These shooting actions are judged and awarded points, and the players compete against one another to gain the highest number of points.

Figure 5:
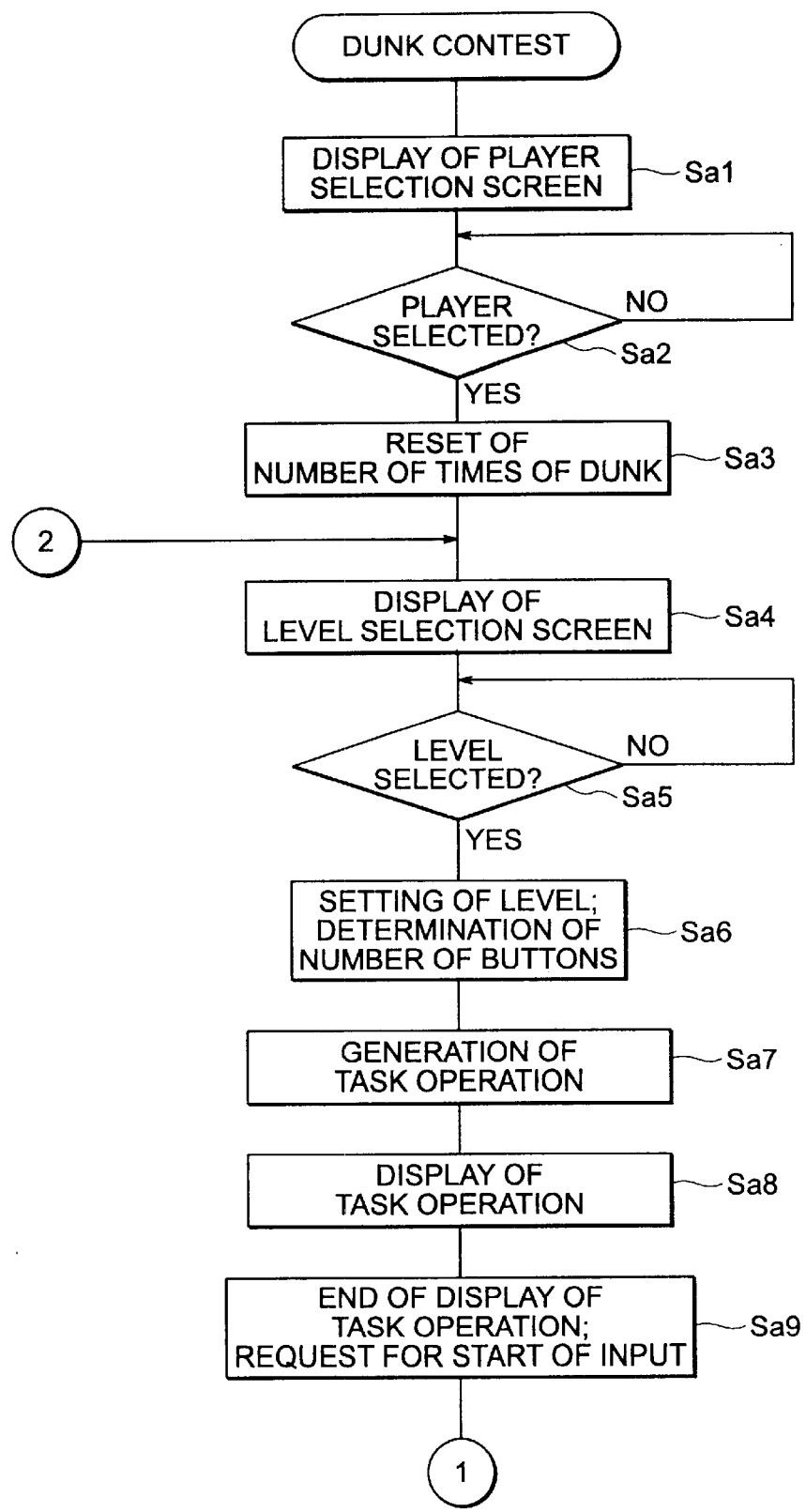
FIG. 5 is a flowchart for describing a dunk contest game relating to the present invention.
Figure 6:
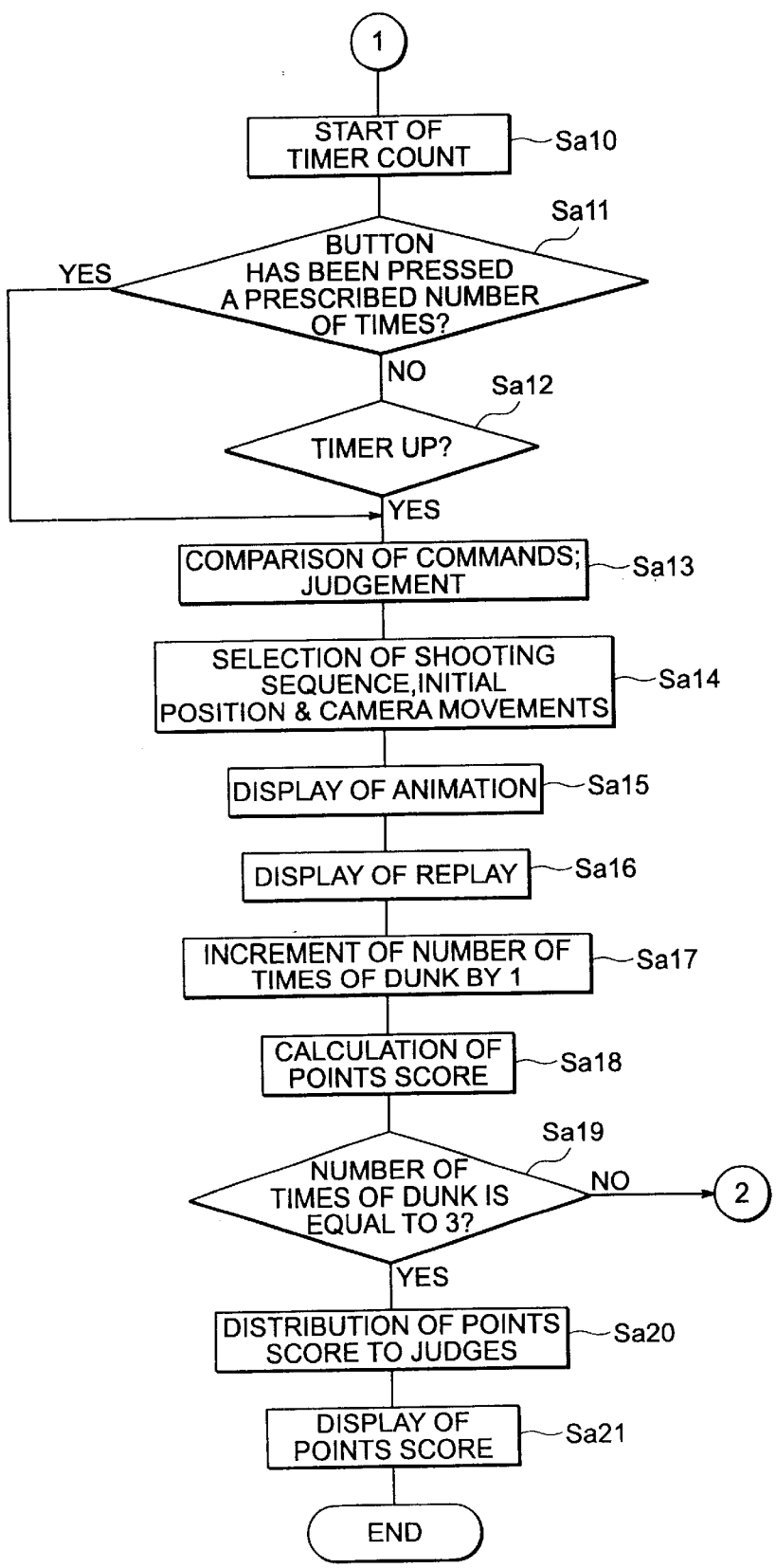
FIG. 6 is a flowchart for describing a dunk contest game relating to the present invention.

Returning now to a description of the game program according to the present invention, when the dunk contest mode is selected, the dunk contest program illustrated in FIG. 5 and FIG. 6 is transferred into the main memory 53 from the storage medium driver 81 (FIG. 1) via the decoder 82. In this state, if the dunk contest program shown in FIG. 5 and FIG. 6 is implemented and the dunk contest program then ends, the device will return to a display of the mode selection screen in step S2, as indicated by the number 1. Moreover, after any of the other modes has been selected and implemented at the mode selection in step S3 (FIG. 3), the device returns similarly to the mode display screen shown in FIG. 4.

Figure 7:
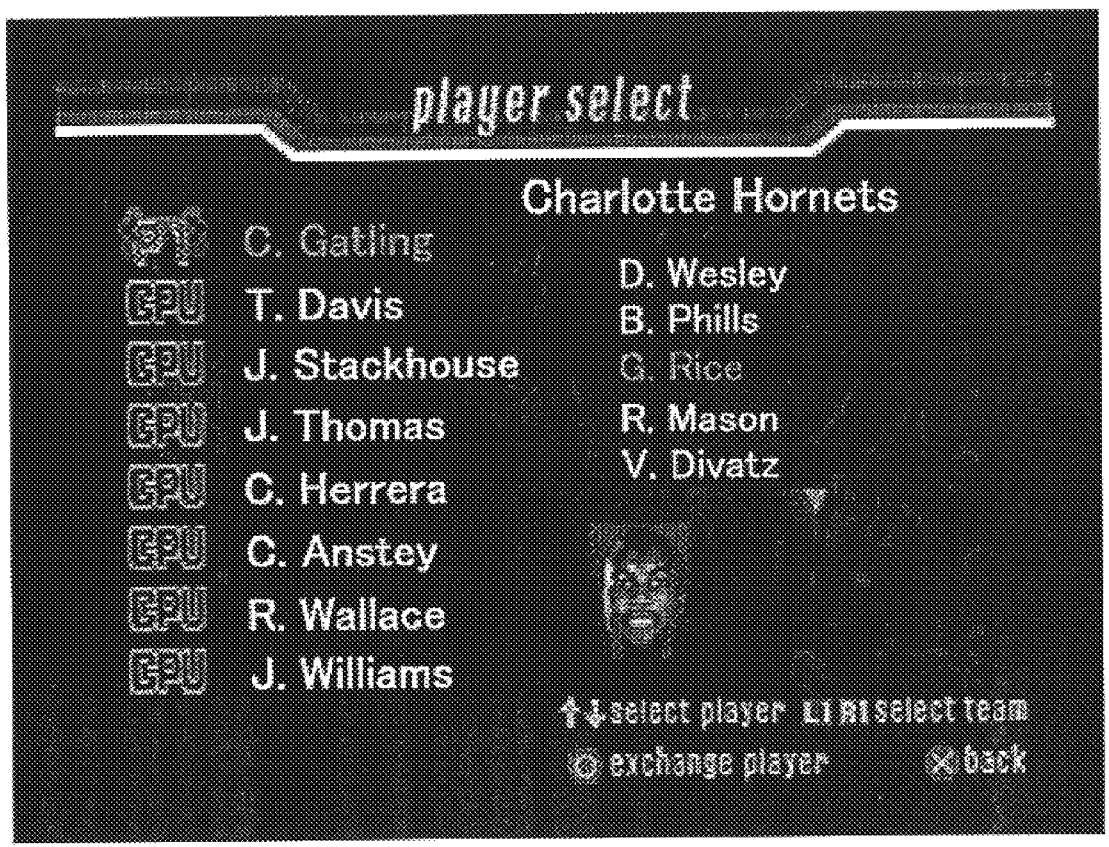
FIG. 7 is an example of a player selection screen for a dunk contest game relating to the present invention.

When the dunk contest mode is selected, the player selection screen display step Sa1 in FIG. 5 is executed. In this case, a player selection screen as shown in FIG. 7 is displayed. On the player selection screen shown in FIG. 7, teams belonging to the NBA can be selected, and players can also be selected.

The user, in other words, the game player, assigns one of the options "CPU, P1, P2, OFF" to all of the 8 players listed. Here, "CPU" denotes that the computer in the game device will control that player, and "P1" and "P2" indicate player 1 and player 2. "OFF" denotes that the player is not selected. "P1" and "P2" may also be displayed alongside a plurality of players. When both "P1" and "P2" are displayed, this indicates that there will be a two-player contest.

In the example illustrated, when "OFF" is not selected, the game becomes a competition among eight (8) players and is played over three rounds. If six (6) of the eight players are set to "OFF", then the game becomes a simple head-to-head match between two players. In this case, this round directly becomes the final (third round).

In this way, the number of rounds of competition can be varied among the players participating in the game illustrated. The game is also set in such a manner that as the competition approaches the final round, any players controlled by the CPU become stronger, such that they gain higher scores. Therefore, the level of difficulty can be adjusted by means of the players controlled by the CPU.

In the example illustrated in FIG. 7, only one player (C. Gatling) is selected by the user P1, and the other seven players are marked as "CPU", and hence are to be controlled by the computer contained in the game device.

At step Sa3, the counter for counting the dunk shots is reset to 0. This counter calculates the number of dunk shots that have been made, in other words, the number of times that steps Sa4 to Sa18 have been repeated. Steps Sa4 to Sa18 principally involve processing relating to one dunk shot cycle. In the present embodiment, this processing is repeated three times (see step Sa19).

Figure 8:
FIG. 8 is an example of a level selection screen for a dunk contest game relating to the present invention.

Next, the player selects a level representing the difficulty of the game, from levels 1 to 5 (step Sa4). FIG. 8 is an example of a screen displayed in this case. "Select Level" is displayed in the center of the screen, and beneath this, a number "3" indicating the game level is displayed. This number can be selected by the user, by pressing either the up direction key 93U or the down direction key 93D, and the level selected here is then set (step Sa6).

Next, the processing relating to one dunk shot cycle will be described. Firstly, a task operation is generated (step Sa7). A task operation is a key input operation which must be input by the player using the input device. In the present embodiment, the first button 93c, second button 93d, third button 93e and fourth button 93f (hereinafter, respectively called □, Δ, ○ and x ) are used, and these buttons are combined randomly according to a number which corresponds to the level selected at step Sa6, as illustrated in Table 1, to generate a single multiple-key combination, which represents a task operation.

TABLE 1

| Level | Number of Buttons |
|---|---|
| 1 | 3 |
| 2 | 5 |
| 3 | 7 |
| 4 | 9 |
| 5 | 11 |

Figure 9:
FIG. 9 is an example of a task operation display screen.

For example, in level 1, one of the four buttons, □, Δ, ○ and x, is selected at random, and this random selection is repeated three times. Consequently, one multiple-key combination is randomly selected, wherein three of the four types of buttons are chosen, multiple use of a key also being allowed. The task operation generated in this way is then shown to the player by means of the screen display device, as shown in FIG. 9 (step Sa8). In FIG. 9, "Please input" is displayed below the player character, followed by the task operation, ○Δ□xΔ○.

The displayed task operation disappears from the screen after a prescribed period of time (for example, 7 seconds) has elapsed. Thereupon, a screen prompting the player to input the task operation is displayed, and a sequence for receiving the task operation as input by the player (hereinafter, called an input operation) is initiated (step Sa9), whilst a timer also initiates a time count (step Sa10). At the same time that the sequence for receiving an input operation is initiated, a whistle sound may be output from the speaker 73.

Figure 10:
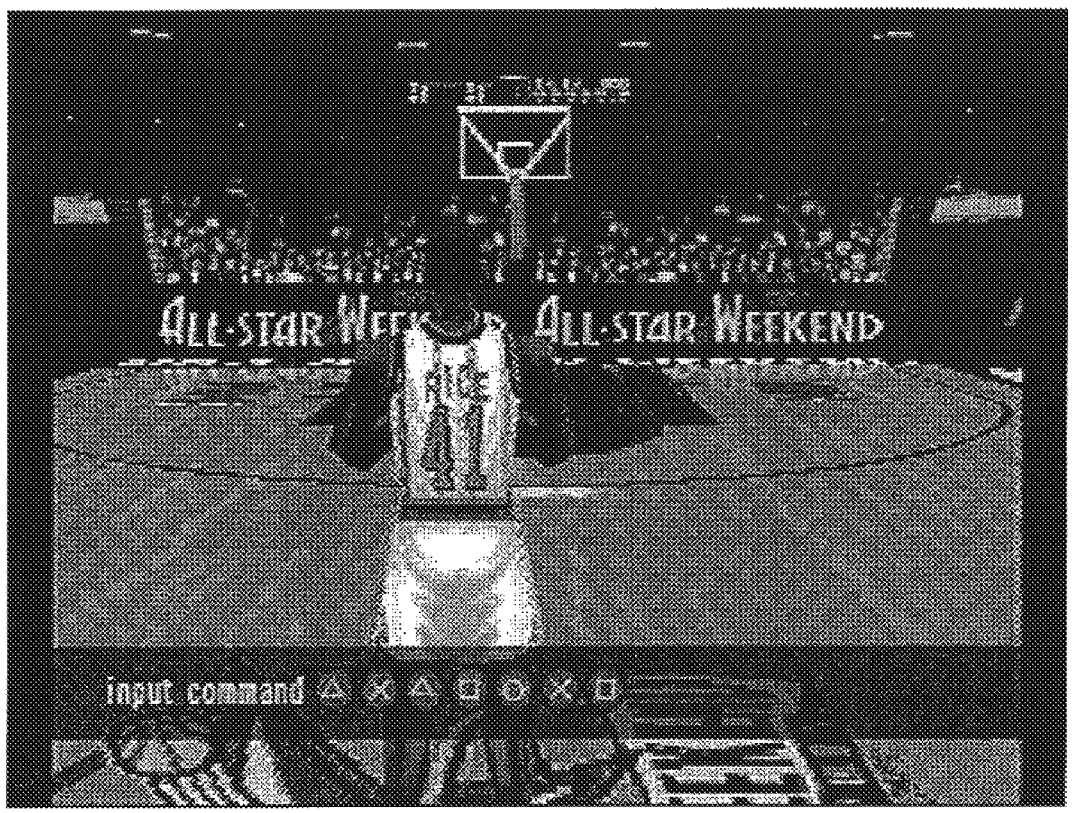
FIG. 10 is an example of a task operation input screen for a dunk contest game relating to the present invention.

A screen such as that shown in FIG. 10 is displayed and an input operation is received, until either of the following conditions is satisfied, namely, either until the number of buttons pressed during the input operation reaches the number of buttons corresponding to the level set at step Sa6, or until a predetermined time limit (for example, 10 seconds) has elapsed (steps Sa11, 12). If the prescribed number of buttons has been pressed before the time limit has elapsed, then the aforementioned timer calculates the period of time taken until the last button is pressed and this time is recorded.

If either one of the conditions is satisfied, then it is determined whether or not the dunk shot has been successful, by comparing the task operation generated at step Sa7 with the input operation input by the player via the input device in steps Sa10 to 12 (step Sa13). If the task operation and the input operation match completely, then the dunk shot is regarded as being successful. Conversely, if even one of the buttons pressed was incorrect, or if the prescribed number of button inputs was not completed within the time limit, then the shot is regarded as being a failure. In the present embodiment, the shooting action scene is determined by means of a two-value judgement indicating whether or not the task operation and the input operation match completely, but it may also be evaluated in multiple stages involving three or more judgement values. For example, in a case where a multiple key combination involving 10 buttons is specified as the task operation, rather than simply judging success and failure, it is possible to portray the features of a dunk contest more realistically by applying various judgements, such as complete failure (correct score 0), partial failure (correct score 6), partial success (correct score 7), complete success (correct score 10), and changing the animation display, which is described later, according to the judgement received. Moreover, it is not always necessary to apply success and failure judgements. In other words, since, given the skill of the players in the dunk contest, it is almost certain that the ball will go into the basket, it is also possible to devise a shoot action mode wherein the ball always goes into the basket on every shot, but the success of the shot is evaluated according to the correct score as an unskilled shot (correct score 0), conventional shot (correct score 3), fairly good shot (correct score 7), or extremely impressive shot (correct score 10).

When the success of failure of a dunk shot has been judged, an animation corresponding to the judgement result is generated. A shooting sequence is a process whereby the player runs up towards the basket and puts the ball into the basket, and a plurality of shooting sequences are prepared respectively for a successful shot at each game level and for failed shots.

TABLE 2

| | |
|---|---|
| Level 1 | Shooting Sequence 1 |
| | Shooting Sequence 2 |
| | . . . |
| | Shooting Sequence N |
| Level 2 | Shooting Sequence 1 |
| | Shooting Sequence 2 |
| | . . . |
| | Shooting Sequence N |
| . . . | . . . |
| Level 5 | Shooting Sequence 1 |
| | Shooting Sequence 2 |
| | . . . |
| | Shooting Sequence N |
| Failure | Shooting Sequence 1 |
| | Shooting Sequence 2 |
| | . . . |
| | Shooting Sequence N |

In the event of a successful shot, one of the shooting sequences is selected at random from the level set at step Sa6, whereupon an initial position for the player to start running is selected at random, namely, directly in front of the basket, to the right-hand side, or to the left-hand side, and then a camera position forming a viewpoint for generating an animation sequence in combination with this initial position is selected at random. In this way, an animation sequence is generated by means of polygons, wherein the player starts at the initial position and moves to the basket (step Sa14). Similar processing is applied in the event of a failed shot.

Figure 11:
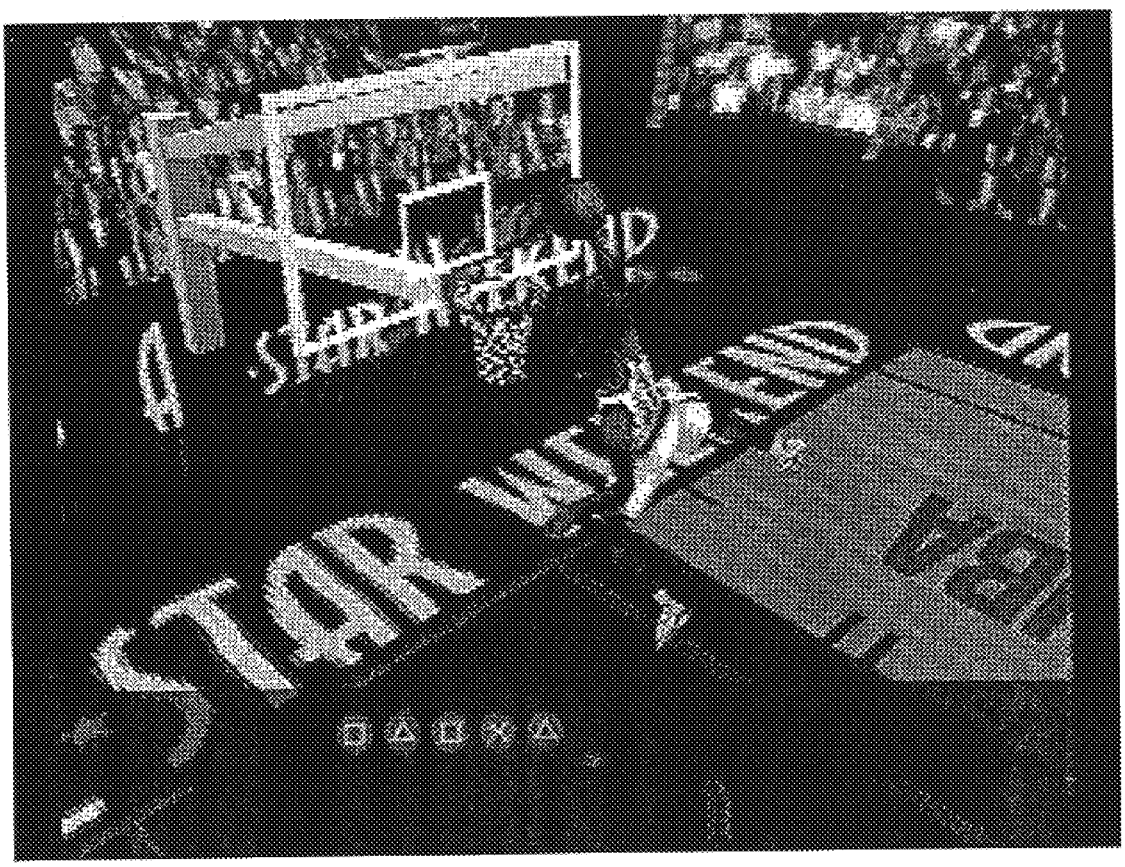
FIG. 11 is an example of a screen illustrating a dunk shooting action in a dunk contest game relating to the present invention.

The generated animation sequence is displayed on the screen, as shown in FIG. 11 (step Sa15). During this display, the player's input operation is shown in the bottom portion of the screen. Thereupon, the same shooting sequence is shown in slow motion replay (step Sa16). The slow motion replay is shown in three times, from different camera positions. During the three slow motion replays, the task operation generated at step Sa7 and the player's input operation are both displayed. Moreover, it is also possible to devise the game in such a manner that if the x button, for example, is pressed during the slow motion replay, then the slow motion play is halted.

Thereupon, the counter initialized at step Sa3 is incremented by +1 (step Sa17), and a points score for evaluating the current dunk shot is calculated. If the dunk shot is second or a third shot, then a total points score up to the current time is also calculated (step Sa18). As illustrated in Table 3, the points score for one dunk shot is calculated on the basis of the level selected at step Sa6, and the amount of time required for the input operation, as measured by the timer.

TABLE 3

| Level | Points |
| --- | --- |
| Failure | 5–10 |
| 1 | 36–52 |
| 2 | 48–64 |
| 3 | 60–76 |
| 4 | 72–88 |
| 5 | 84–100 |

In other words, assuming two cases where the same shot is made successfully at level 1, the points score will be higher in the case where the time required for the input operation is shorter. If the shot is unsuccessful, then a score is awarded in a random manner, regardless of the required time.

Figure 12:
FIG. 12 is an example of a points display screen for a dunk contest game relating to the present invention.

Steps Sa7 to 18 are repeated three times, and on each occasion the points score for each shot is added to the total points score. When the third shot has been completed, the total points score is converted to a score wherein 50 points represents a full score, and after this conversion, the total points score is then divided by 5. The divided number of points represents the number of points awarded by five people judging the dunk shot, and therefore the total points score is divided in such a manner that it has a suitable variation (step Sa20). Up to this stage, the points score is calculated without being displayed to the player, and after this calculation has been completed, the points awarded by the judges are displayed and then the total of these points scores is displayed as a total score (step Sa21). Thereby, the total score appears to be derived by adding together the points awarded by each of the judges, as illustrated in FIG. 12.

The operations illustrated in FIG. 3, FIG. 5 and FIG. 6 can be realized by causing the CPU 51 shown in FIG. 1 to implement instructions from the player, executing the program transferred into the main memory by means of the CPU 51, and controlling the graphic controller 60 in accordance with the processing results. This means that the CPU 51 and the graphic controller 60 function as a co-processor and constitute a screen display device for displaying images of the aforementioned dunk contest on the display device. In this case, the graphic controller 60 displays the basketball court along with the players on the display device, and it also displays each of the screens described above on the display device. The CPU 51, on the other hand, performs operations such as generating task inputs, comparing a player's input operation with a task input, judging which shooting sequence is to be displayed, and the like. The program specifying the operations illustrated in FIG. 3, FIG. 5 and FIG. 6 is stored in the storage medium 84 and it is transferred into the main memory 53 upon instruction from the player.

According to the present invention, it is possible to play basketball shooting games of various types having varying levels of difficulty, without requiring expert skill, by means of the user performing simple operations only.

Above, the present invention was described on the basis of an embodiment, but the present invention is not limited to this, and it is also possible to adopt various modifications and improvements within the normal range of knowledge of people working in this field.

What is claimed is:

1. A method for displaying a situation of a character performing a shooting action in a video game based on the theme of a ball game which includes a shooting action in the roles thereof, comprising the steps of:

specifying operations which are to be input by a player as a task operation;

displaying the task operation on a screen;

erasing the displayed task operation from the screen;

receiving an input operation from a player;

determining a shooting action scene on the basis of the degree of agreement between the task operation and the input operation;

displaying a situation wherein a character in the game performs a shooting action in accordance with the shooting action scene determined in said determining step, on the display device; and wherein said determining step comprises the steps of:

grading the degree of agreement between the task operation and the input operation-into a plurality of ranks; and individually determining a shooting action scene on the basis of each rank.

2. A method for displaying a situation of a character performing a shooting action in a video game based on the theme of a ball game which includes a shooting action in the rules thereof, comprising the steps of:

specifying operations which are to be input by a player as a task operation;

displaying the task operation on a screen;

erasing the displayed task operation from the screen;

receiving an input operation from a player;

determining a shooting action scene on the basis of the degree of agreement between the task operation and the input operation;

displaying a situation wherein a character in the game performs a shooting action in accordance with the shooting action scene determined in said determining step, on the display device; and wherein said task operation involves pressing buttons on an input device provided with n types of button, according to a sequence of one combination involving r buttons (where n and r are natural numbers and any button may be used more than once).

3. The method according to claim 2, wherein said r is specified according to a previously determined level of difficulty.

4. The method according to claim 3, wherein said displaying step displays different animation sequences, according to the shooting action scene determined at said determining step, and said level of difficulty.

5. A method for displaying a situation of a character performing a shooting action in a video game based on the theme of a ball game which includes a shooting action in the rules thereof, comprising the steps of:
- specifying operations which are to be input by a player as a task operation;
- displaying the task operation on a screen;
- erasing the displayed task operation from the screen;
- receiving an input operation from a player;
- determining a shooting action scene on the basis of the degree of between the task operation and the input operation;
- displaying a situation wherein a character in the game performs a shooting action in accordance with the shooting action scene determined in said determining step, on the display device; and
- wherein said ball game is a dunk contest in a basketball competition.

6. A computer-readable storage medium for storing a video game program based on the theme of a ball game which includes a shooting action in the rules thereof,
- wherein said video game program causes a computer to execute processing for:
- specifying operations to be input by a player as a task operation;
- displaying said task operation on a screen;
- erasing said displayed task operation from the screen;
- receiving an input operation from a player;
- determining a shooting action scene on the basis of the degree of agreement between the task operation and said input operation; and
- displaying a situation wherein a character in the game performs a shooting action in accordance with the shooting action scene determined in said determining step, on the display device;
- wherein said determining process comprises the processes of:
  - grading the degree of agreement between the task operation and the input operation into a plurality of ranks;
  - individually determining a shooting action'scene on the basis of each rank; and
  - displaying a situation wherein a character in the game performs a shooting action according to the shooting action scene determined in said determining step, on a display device.

7. A computer-readable storage medium for storing a video game program based on the theme of a ball game which includes a shooting action in the rules thereof,
- wherein said video game program causes a computer to execute processing for:
- specifying operations to be input by a player as a task operation;
- displaying said task operation on a screen;
- erasing said displayed task operation from the screen;
- receiving an input operation from a player;
- determining a shooting action scene on the basis of the degree of agreement between the task operation and said input operation; and
- displaying a situation wherein a character in the game performs a shooting action in accordance with the shooting action scene determined in said determining step, on the display device;
- wherein said task operation involves pressing buttons on an input device provided with n types of button, according to a sequence of one combination involving r buttons (where n and r are natural numbers and any button may be used more than once).

8. The storage medium for storing a game program according to claim 7, wherein said one combination is generated at random at each determining step.

9. The storage medium for storing a game program according to claim 7, wherein said r is specified according to a previously determined level of difficulty.

10. The storage medium for storing a game program according to claim 9, wherein said displaying step displays different animation sequences, according to the shooting action scene determined at said determining step, and said level of difficulty.

11. A computer-readable storage medium for storing a video game program based on the theme of a ball game which includes a shooting action in the rules thereof,
- wherein said video game program causes a computer to execute processing for:
- specifying operations to be input by a player as a task operation;
- displaying said task operation on a screen;
- erasing said displayed task operation from the screen;
- receiving an input operation from a player;
- determining a shooting action scene on the basis of the degree of agreement between the task operation and said input operation; and
- displaying a situation wherein a character in the game performs a shooting action in accordance with the shooting action scene determined in said determining step, on the display device;
- wherein said displaying step displays different animation sequences, according to the period of time required from the start to completion of said input operation receiving step, and the degree of agreement between said input operation and said task operation.

12. A video game device, provided with an input device for receiving input operations from a player and means for displaying said input operations on a screen, for executing a video game based on the theme of a ball game which includes a shooting action in the rules thereof, comprising:
- means for specifying operations which are to be input by a player as a task operation;
- means for displaying the task operation on a screen;
- means for erasing the displayed task operation from the screen; and
- means for displaying a situation wherein a character in the game performs a shooting action in accordance with the shooting action scene determined in said determining step;
- wherein said determining means comprises:
  - means for grading the degree of agreement between the task operation and the input operation into a plurality of ranks; and
  - means for individually determining a shooting action scene on the basis of each rank.

13. A video game device, provided with an input device for receiving input operations from a player and means for displaying said input operations on a screen, for executing a video game based on the theme of a ball game which includes a shooting action in the rules thereof, comprising:

> means for specifying operations which are to be input by a player as a task operation;
>
> means for displaying the task operation on a screen;
>
> means for erasing the displayed task operation from the screen; and
>
> means for displaying a situation wherein a character in the game performs a shooting action in accordance with the shooting action scene determined in said determining step;
>
> wherein said task operation involves pressing buttons on an input device provided with n types of button, according to a sequence of one combination involving r buttons (where n and r are natural numbers and any button may be used more than once).

14. The video game device according to claim 13, wherein said one combination is generated at random at each determining step.

15. The video game device according to claim 13, wherein said r is specified according to a previously determined level of difficulty.

16. The video game device according to claim 15, wherein said displaying means displays different animation sequences, according to the shooting action scene determined by said determining means, and said level of difficulty.

17. A video game device, provided with an input device for receiving input operations from a player and means for displaying said input operations on a screen, for executing a video game based on the theme of a ball game which includes a shooting action in the rules thereof, comprising:

> means for specifying operations which are to be input by a player as a task operation;
>
> means for displaying the task operation on a screen;
>
> means for erasing the displayed task operation from the screen; and
>
> means for displaying a situation wherein a character in the game performs a shooting action in accordance with the shooting action scene determined in said determining step;
>
> wherein said displaying means displays different animation sequences, according to the period of time required from the start to completion of said input operation receiving step, and the degree of agreement between said input operation and said task operation.

* * * * *